July 14, 1936.  J. C. MacLACHLAN  2,047,699

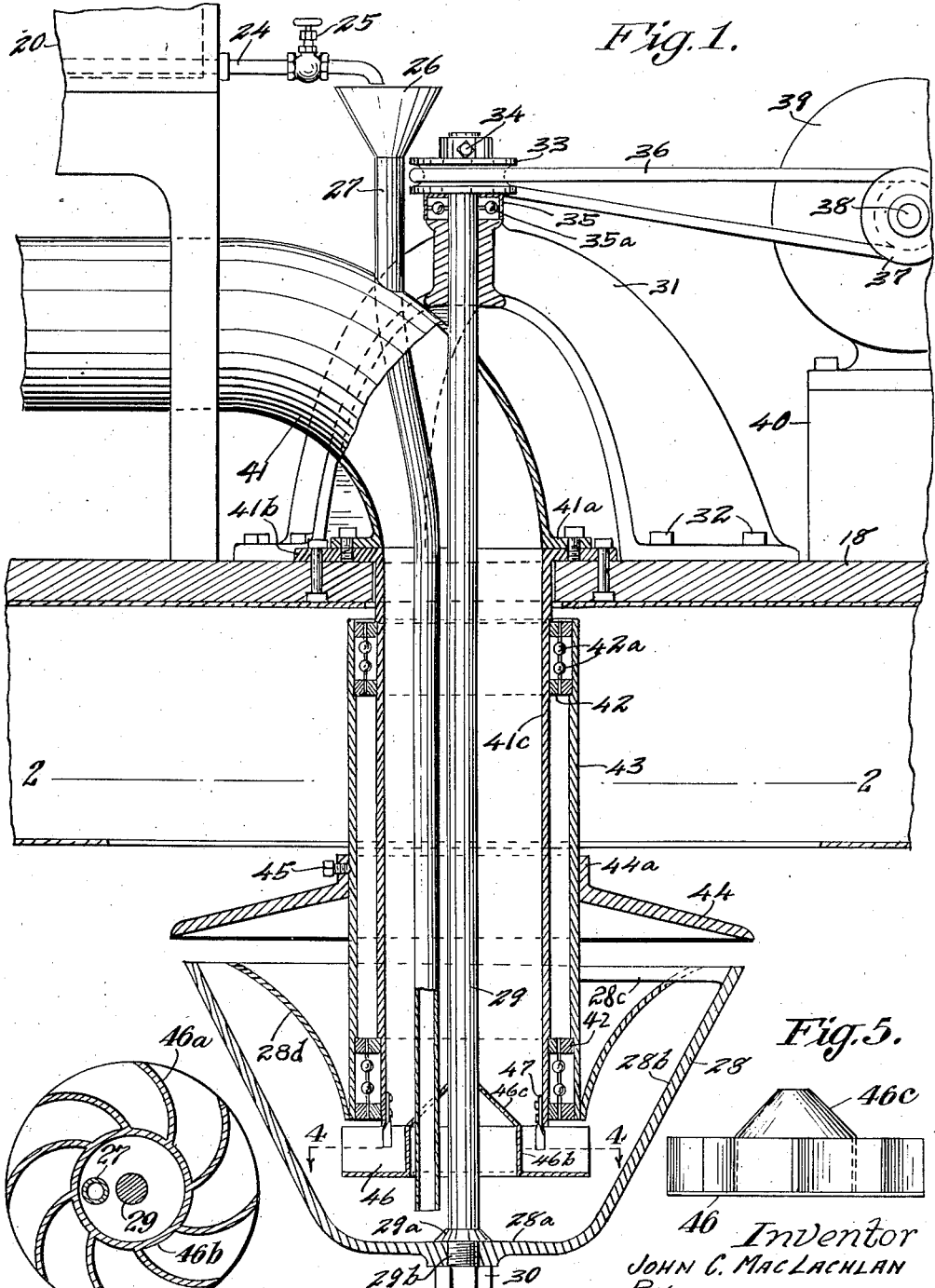

SPRAYING APPARATUS FOR LIQUID AND SEMILIQUID MATERIAL

Filed Feb. 5, 1934  2 Sheets-Sheet 2

Inventor
JOHN C. MacLACHLAN
By
Chas. C. Reif.
Attorney

Patented July 14, 1936

2,047,699

UNITED STATES PATENT OFFICE 2,047,699

SPRAYING APPARATUS FOR LIQUID AND SEMILIQUID MATERIAL

John C. MacLachlan, Chicago, Ill., assignor to Harold L. Perlman, Chicago, Ill.

Application February 5, 1934, Serial No. 709,822

8 Claims. (Cl. 299—63)

This invention relates to a process and apparatus for drying liquid and semi-liquid material. While the invention is applicable to practically all liquid or semi-liquid materials it is used with special efficiency in drying such materials as skim milk, whole milk, meat products, fruit juices and similar materials. Dry milk is now used in large quantities in various arts and it is desirable to have an apparatus by means of which the milk can be dried efficiently, quickly and at comparatively small expense. It is also desirable to have the milk so dried that a very soluble product is obtained.

It is an object of this invention, therefore, to provide a simple and efficient method and apparatus for quickly drying milk and other liquid and semi-liquid materials and producing products of high solubility.

It is a further object of the invention to provide an apparatus for drying milk and other liquid or semi-liquid materials in which the material is projected and finely divided by a novel use of air and mechanical action.

It is also an object of the invention to produce an apparatus for drying milk and other liquid or semi-liquid materials in which the milk is delivered to a receptacle and centrifugally projected therefrom, air also being delivered to said receptacle to assist in the movement of said material.

It is more specifically an object of the invention to provide an apparatus for drying milk or other liquid or semi-liquid materials comprising a receptacle of bowl-shape to which said material is delivered and to which air is also delivered, said bowl being rotated and the material moved upwardly along the wall thereof by said rotation and by the action of the air, both the air and material being projected at the top of said receptacle.

These and other objects and advantages of the invention will be fully set forth in the following description made in connection with the accompanying drawings, in which like reference characters refer to similar parts throughout the several views and in which:—

Fig. 1 is a central vertical section through the milk dividing and projecting means in the drying cabinet, some parts being shown in elevation;

Fig. 4 is a horizontal section taken on line 5—5 of Fig. 1 as indicated by the arrows; and Fig. 5 is a view in side elevation of said deflector.

Figure 3:
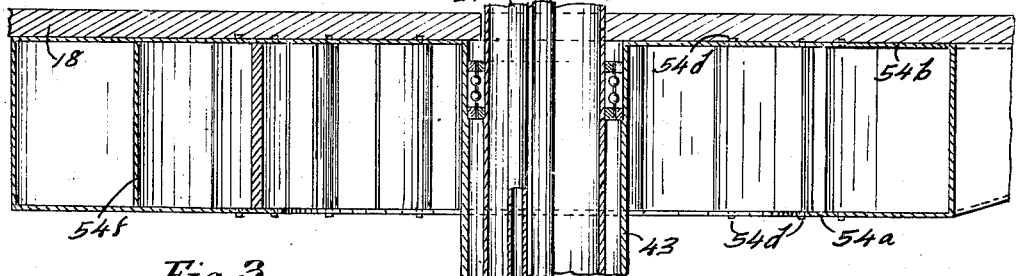
Fig. 3 is a central vertical section taken substantially on line 3—3 of Fig. 2 as indicated by the arrow, with the top portion also shown and some parts omitted.
Figure 2:
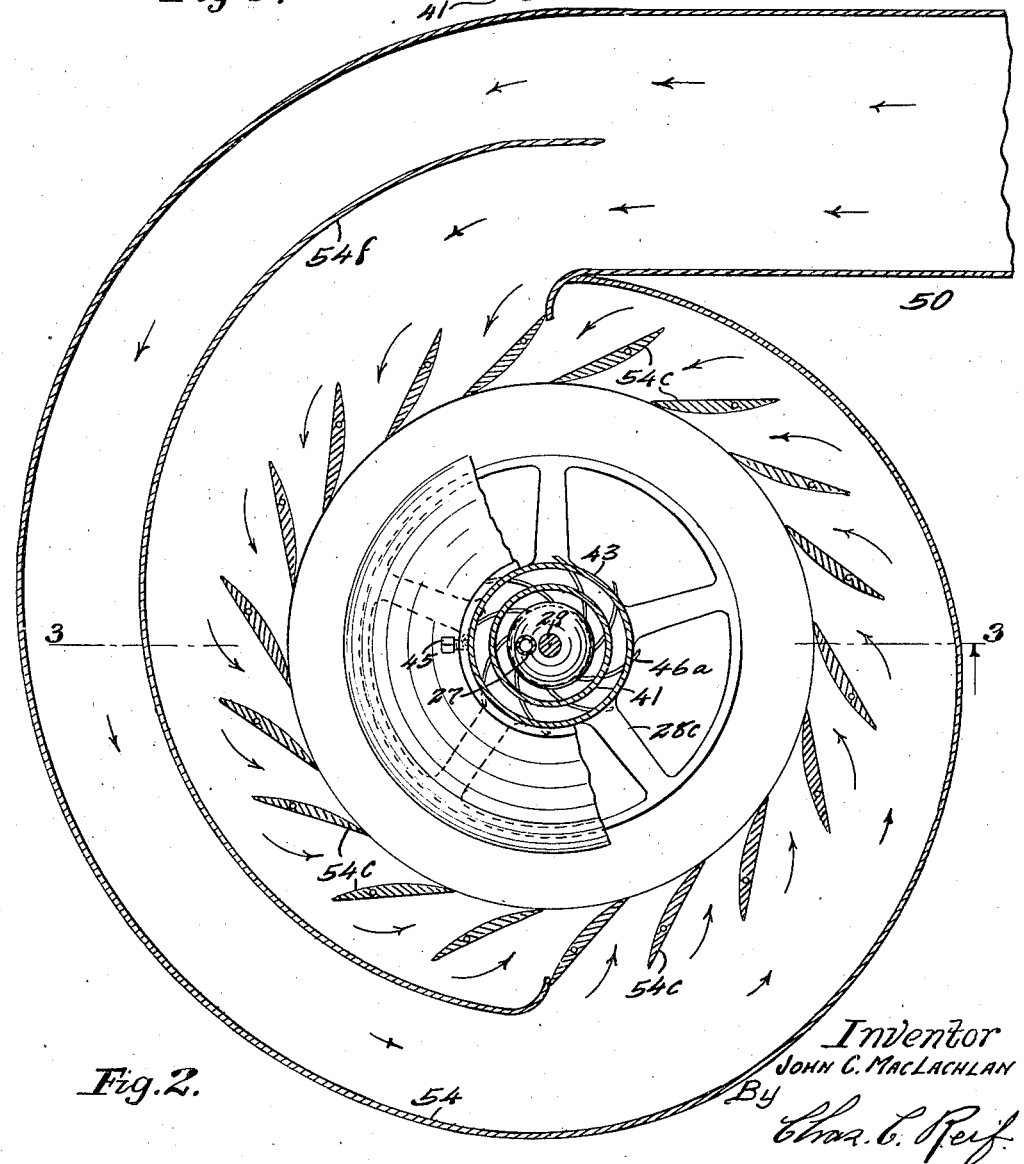
Fig. 2 is a section taken substantially on line 2—2 of Fig. 1 as indicated by the arrow and showing the air distributing means.

Referring to the drawings, a portion of a milk drying apparatus or plant is shown comprising a supply tank 20. After preferably being heated the liquid such as milk is discharged through the pipe 24 controlled by valve 25 to a funnel 26 secured to the top of a pipe or conduit 27 which forms the feed supply pipe for the milk distributing mechanism in the drying cabinet. This distributing mechanism comprises a rotatable member 28 (see Fig. 2) having a chamber therein, said member being illustrated as in the form of a bowl having a substantially horizontal bottom 28a and an upwardly and outwardly sloping wall 28b. Said receptacle has a central external boss at its bottom and a shaft 29 having a frusto-conical collar 29a thereon has a portion 29b at one side of said collar threaded into the bottom of receptacle 28 and said boss and equipped with a nut 30 engaging the under surface of said boss. Shaft 29 extends upwardly being journaled in a bracket 31 having a plurality of legs or standards secured by the bolts 32 to a floor 18 and also having at its upper end a grooved pulley 33 provided with a hub secured to said shaft by one or more set screws 34. A ball bearing 35 having balls 35a therein is disposed between pulley 33 and the top of bearing 31 and acts to take the downward thrust of shaft 29. Pulley 33, shaft 29 and member 28 are rotated at very high speed by belt 36 passing over pulley 33 and which also passes over a pulley 37 secured to the motor shaft 38 of a motor 39 shown as mounted upon a base or pedestal 40 supported on upper floor 18. A conduit 41 has a flange 41a bolted to flange 41b of a conduit 41c extending through floor 18 and downwardly therefrom centrally in member 28 and having an open lower end disposed some distance above the bottom 28a. Flange 41b is bolted to floor 18. Conduit 41 has spaced ball bearing casings 42 secured thereto having therein the balls 42a and a cylinder 43 is secured to the movable element of casings 42, the same being disposed coaxially with shaft 29. Receptacle 28 has a series of circumferentially spaced radial arms 28c at its upper end secured to cylinder 43. Said receptacle also has an inner wall or deflector 28d extending from the bottom of tube 43 to which it is secured, upwardly and outwardly to adjacent the upper edge of wall 28b of said receptacle. A plate 44 has a central hub 44a secured to cylinder 43 by one or more set screws 45, said plate extending outwardly and downwardly to have its outer edge disposed a short distance above the upper edge of receptacle 28. A deflector 46 having curved blades 46a is disposed at the lower end of conduit 41c and supported therefrom by brackets 47 bolted to said conduit and secured by welding or otherwise to blades 46a. Blades 46a extend outwardly from a cylindrical portion 46b and said portion has a frustoconical portion 46c extending upwardly therefrom to shaft 29, and having a central opening through which said shaft passes. Pipe 27 also passes through portion 46c. Blades or vanes 46a are secured to ring 46b and also to the annular bottom plate 46d.

It will be seen that any milk or other liquid or semi-liquid material which is delivered through pipe 27 will be discharged into the receptacle 28 adjacent the bottom and center thereof. This liquid will be moved out by the centrifugal force caused by rotation of member 28 and will move outwardly along the wall 28b. Air is delivered through pipes 41 and 41c in a manner to be later described and this air is deflected outwardly by portion 46c and passes between the curved blades 46a. The air is thus given a whirling or helical motion and passes outwardly and upwardly along the wall 28b and between the same and inner wall 28d. This air assists the movement of the liquid or semi-liquid material. The air passes out through the narrow passage between the tops of walls 28b and 28d and between the top of member 28 and plate 44. Owing to the narrow outlet between walls 28b and 28d the air passes therefrom at high velocity. The liquid or semi-liquid material is also thrown out or projected outwardly from the edge of receptacle 28 and between walls 28b and 28c at very high velocity so that said material is projected in a very finely divided condition. The projection and division of the material is also accomplished without any impact on the material.

The material is projected outwardly in a drying cabinet of which floor 18 forms the top. Air is delivered into said cabinet through a conduit 52. Conduit 52 extends into an air distributing member 54. Said member has a bottom plate 54a and a top plate 54b, plate 54a being of annular form. A series of deflecting vanes or louvres 54c extend between plates 54a and 54b and are preferably mounted on trunnions 54d whereby they may be oscillated or adjusted. One side of conduit 52 continues around member 54 to form an outer shell 54e and another dividing plate or partition 54f is provided extending substantially halfway around member 54. One side of conduit 52 and also the partition 54f are bent inwardly at their ends to engage substantially with the outer end of one of the vanes or shutters 54c. It is seen that air passing through conduit 52 will be delivered between the vanes 54c and will pass downwardly into said cabinet with a helical motion and engage the material projected outwardly from receptacle 28. The rotating movement of said air is opposite in direction to the rotation of member 28. This air assists in dividing the material and said air is delivered at a high temperature, usually about 270 to 300 degrees F.

The material projected from member 28 is dried almost instantly by the hot air and falls in said cabinet.

As above stated the air delivered through the conduits 41 and 41c passes downwardly through said conduit and then upwardly along the wall of receptacle 28 thus assisting the movement of the liquid. The air is confined by walls 28b and 28c and by plate 44 and thus caused to pass outwardly over the edge of receptacle 28 at quite a high velocity. The air delivered through conduit 41 is at quite a high temperature, usually from 180 to 200 degrees F. This air, of course, thus has quite a drying effect upon the liquid. The air passing outwardly between plate 44 and the upper edge of receptacle 28 assists in the projection of the liquid and also acts to finely divide the liquid. Receptacle 28 in the drying cabinet is usually driven at approximately 2500 R. P. M.

The material is not beaten or broken up by any impact. With materials such as milk the constituent globules are thus not broken. This results in a product which is very soluble. The fat globules in milk being the lightest of the several elements of whole milk, naturally rise to the top. This is true in both original whole milk and reconstituted milk made from a solution of water and dried milk such as the product made with the present invention in which the constituent particles of casein as well as those of the fat and colloidal constituents are unbroken. The rising of the fat globules or cream needs no mechanical aid. It takes place naturally the same in the reconstituted milk as it does in the original milk. To have a reconstituted milk in which the cream will rise it is necessary to have a dried milk powder in which the constituent particles are unbroken and such a product also keeps for a longer time without becoming rancid. If the constituent globules are broken up or the milk homogenized, the keeping properties will not be so good.

From the above description it is seen that applicant has provided a very simple, efficient and practicable method and apparatus for drying milk and other liquid or semi-liquid materials. The apparatus is constructed so as to be easily cleaned and maintained and the product can be produced at comparatively small expense.

It will, of course, be understood that various changes may be made in the form, details, arrangement and proportions of the apparatus and in the steps and sequence of steps of the method without departing from the scope of applicant's invention, which, generally stated, consists in a method and apparatus capable of carrying out the objects set forth, such as disclosed and defined in the appended claims.

What is claimed is:—

1. A spraying head having in combination, a bowl-shaped receptacle, means for rotating said receptacle about a central vertical axis, a stationary conduit extending to adjacent the bottom of said bowl centrally thereof for delivering liquid or semi-liquid material thereto and a conduit extending downwardly into said bowl for delivering air thereto whereby said liquid is thrown outwardly against the wall of said bowl and projected with said air from the upper edge thereof.

2. The structure set forth in claim 1 and a plate surrounding said conduit and extending outwardly above and terminating above the edge of said receptacle.

3. A spraying head having in combination, a receptacle having a concave chamber, a vertical shaft extending centrally of said receptacle, means for rotating said shaft and receptacle, a conduit for delivering liquid or semi-liquid material adjacent the bottom and center of said receptacle, a conduit extending centrally into said receptacle and downwardly therein having an open lower end for delivering air into said chamber and a deflector at the lower end of said conduit for imparting a whirling movement to said air.

4. A distributing head for liquid or semi-liquid material having in combination, a receptacle adapted to receive said material, means for rotating said receptacle about a vertical axis, means for delivering liquid or semi-liquid material to said receptacle, means for delivering air downwardly into said receptacle so as to pass upwardly along the wall thereof and means in said receptacle for confining said air to cause the same to move outwardly over the edge of said receptacle whereby material is projected in finely divided condition from the edge of said receptacle.

5. A distributing head having in combination, a stationary conduit for air, a rotatable receptacle coaxial with said conduit having an upwardly and outwardly inclined wall into which said conduit extends, said conduit having a discharge end spaced some distance above the bottom of said receptacle, a shaft disposed centrally of said receptacle and supporting the same, a bearing for said shaft, means for rotating said shaft and receptacle, a cylindrical member surrounding and mounted for rotation on said conduit and connected to said receptacle for causing said receptacle to rotate about a fixed vertical axis and means for delivering liquid to said receptacle.

6. The structure set forth in claim 5, a deflector at the discharge end of said conduit constructed and arranged to give a whirling motion to the air delivered from said conduit to said receptacle.

7. A distributing head having in combination, a stationary conduit for air, a rotatable receptacle coaxial with said conduit having an upwardly and outwardly inclined wall, said conduit extending downwardly into said receptacle and having a discharge end spaced some distance above the bottom of said receptacle, a shaft disposed centrally of said receptacle and supporting the same, a bearing for said shaft above said receptacle, means for rotating said shaft and receptacle, said receptacle having a part secured thereto mounted for rotation on said conduit for causing said receptacle to rotate about a fixed vertical axis and a plate secured to said part and extending outwardly over the edge of said receptacle a short distance above the same.

8. A distributing head having in combination, a stationary conduit through which air is passed, a rotatable receptacle below and coaxial with said conduit having an upwardly and outwardly inclined wall, said conduit extending into said receptacle and having a discharge end spaced some distance above the bottom of said receptacle, a shaft disposed centrally of said receptacle and supporting the same, a bearing for said shaft, means for rotating said shaft and receptacle, said receptacle having a cylindrical member attached thereto surrounding said conduit and extending upwardly along the same and spaced bearings carried by said conduit by which said cylindrical member and receptacle are rotatably mounted on said conduit whereby said receptacle is maintained about a fixed axis in its rotation.

JOHN C. MacLACHLAN.